UNITED STATES PATENT OFFICE 2,047,967

THERMOPLASTIC COMPOSITIONS

Henry Jacobsen, now by judicial decree to Henry Jenett, West Englewood, N. J., assignor to Celanese Corporation of America, a corporation of Delaware No Drawing. Application November 4, 1932, Serial No. 641,233

2 Claims. (Cl. 106—40)

This invention relates to a novel process of compounding thermoplastic materials from such bases as cellulose esters, or ethers, vinyl esters, or chlorinated rubber, for instance, and to simplified methods of application of the compounds, so produced, to the various arts.

The term "thermoplastic materials", recurring in this description, covers all substances, or compositions of substances, which, with the aid of heat and pressure, will fuse and assume any desired shape or form.

The methods of application, hereinafter described, cover the art of coating or laminating any base, such as wood or metal, for instance, with a layer of a thermoplastic composition, the art of impregnating or saturating any base, such as fibre-board or fabric, for instance, as well as the art of forming solid bodies, from thin films to heavy articles.

Heretofore, in the production of thermoplastic compounds, notably those with a cellulose ester, or ether, vinyl ester, or chlorinated rubber base, the principle of a solution had generally been followed. In fact, the successful application of such thermoplastic compounds to the various arts, from surface coatings to solid bodies, such as films, for instance, depended on the thermoplastic compound being in solution.

Especially where the thermoplastic substances, above referred to, had to be combined with other ingredients to form special compositions, adaptable to the various arts, notably, with gums or resins to give adhesion or gloss, with oils or plasticizers to obtain elastic or pliable properties, with dyes, lakes, or pigments for coloring, opacity, or density, or with inert substances, such as wood-flour, comminuted fibres, or powdered minerals for stretching, toughness, or insulation, the thermoplastic base had to be brought into a state of flux: it had to be reduced from whatever physical shape or form it was available in, viz. flock, grain, fibre, flake, etc., to the simplest the smallest physical aggregate possible, so that by means of agitation, kneading, rolling, pressure, extrusion, or any other mechanical aid known in the related arts, a very intimate, thorough mixture of the thermoplastic base and the other components, above referred to, could be effected.

This state of flux, in which the thermoplastic base is reduced to its smallest physical aggregate, is generally achieved by means of organic solvents and diluents, such as ketones, esters, alcohols, hydrocarbons, and by mixtures of solvents and non-solvents, in some instances even by hot mixtures of non-solvents, as in the case of some types of cellulose acetate soluble in hot mixtures of alcohol-benzol, or of alcohol-water.

Attempts to eliminate the use of volatile solvents by incorporating a large surplus of high-boiling plasticizer, did not prove practical, as the resulting compositions were too flexible to be of any commercial value. The addition of wetting media, such as water, for instance, to the plastic base, in order to facilitate the distribution of the normally small quantities of plasticizer, also did not solve the problem, especially as the resulting masses had to be reduced in attrition mills to a form applicable to the various arts, the latter step being both cumbersome and very hazardous.

Aside from the loss of time, high cost, fire hazard and toxicity, which are well-known handicaps to the manufacturer and fabricator of thermoplastic compounds, made and applied with the aid of organic solvents, there are the factors of blush, oxidation, livering, etc. and such conditions as compatibility, tolerance, retentivity, etc., to mention just a few of the adverse phenomena well known to those familiar with the arts, to cope with.

While the balancing or blending of solvents goes a long way towards remedying some of these handicaps, and while it is possible to compound nitro-cotton, insoluble in hydrocarbons, with a resin, insoluble in esters or in alcohol, by using a blended solvent, the component parts of which are ideal solvents of the cotton and of the resin respectively, it still is impossible, by any of the known methods, to overcome such incompatibility as that existing between cellulose acetate and shellac, or cellulose acetate and linseed oil, even when each of the substances mentioned be cut in its optimum solvent.

Shellac and linseed oil are particularly mentioned, because they are commonly used ingredients, which lend most desirable characteristics to plastic materials, but which can not be incorporated with cellulose acetate even in small proportions, without causing precipitation of the solution, thereby destroying the homogeneity of the plastic composition.

As distinguished from the known processes, which are based on the principle of a solution, the principle I follow in the production of thermoplastic compounds is based on the homogeneization of all the component parts by purely mechanical means, coupled with a simultaneous disaggregation of the so homogeneized compound, i. e. a stripping, or breaking up to the smallest possible physical aggregate.

The process is characterized by the absence of solvent media and by the utilization of liquid dispersing media, which, being non-solvents, or precipitants of the component parts of the given thermoplastic composition, prevent the agglomeration of the mechanically homogeneized particles, thereby keeping the compound in a form suitable for any application, without further chemical or mechanical treatment.

The types of compositions, the methods and the apparatus employed in producing them, as well as the means of utilizing them in the various arts, which are described below, are given by way of example and illustration only. It is not my intention to limit the invention to either composition, apparatus, or method of application disclosed herein, as the principle claimed for this process applies to any thermoplastic compound and permits of a number of variations of method of production and application, as well as of apparatus.

By way of example I will now describe the production of a thermoplastic composition, the basis of which may be any of the known organic derivatives of cellulose:

A quantity of cellulose ester, or ether, a suitable amount of solid or liquid plasticizer, coloring matter and any other organic or inorganic filling or stretching media, such as oils, gums, resins, comminuted vegetable fibres, pulverized mineral or metal substances, etc., are fed into a suitable colloidal mill, using as a vehicle or dispersing medium either water or some other neutral liquid, which is not a solvent of any of the components. The mechanical action of the mill causes not only disintegration of the components, but it also homogeneizes them, so that they form a perfect plastic compound, while the dispersing medium, being a non-solvent, or a precipitant of the compound, prevents the minute particles of the thermoplastic compound, thus formed, from combining into a coherent, more or less tacky or sleazy mass, which would normally result from the addition of water to a composition of the nature above described.

Depending upon the nature of the composition, i. e. the density of the various component parts, also depending upon the type of equipment employed and the art in which the thermoplastic composition is to be used, the proportion of solids and liquid dispersing medium will vary within far limits. But irrespective of these proportions, the solids will always be found to be a perfectly homogeneous plastic compound in extremely finely divided form.

When diluted with the same medium, in which they were originally dispersed, these particles will, of course, not remain in suspension very long, but will settle out as a composition, each individual particle containing in proportion the same quantity of the components, originally passed through the mill, and although no protective colloid, or any similar aid, had been employed, the components will not separate out, even when left standing for an indefinite period and in extreme dilution.

This is very remarkable insofar as certain substances which can not be made compatible by any of the known methods, heretofore employed in the production of thermoplastic compounds, when compounded by the process above described will form plastics, which will not only fuse under heat and pressure, but which will also become soluble in the solvent media of the base.

Thus, for instance, compositions containing equal parts of cellulose acetate and shellac, or compositions containing 70% cellulose acetate and 30% linseed oil, will become soluble in acetone, or any other good solvent of cellulose acetate.

Similarly, even a minute quantity of oil-soluble dyestuff can be distributed evenly over a very large volume of cellulose ester plastic composition. This will be apparent from a uniformly tinted sample of film produced from such composition by either compressing it between two hot steel plates, or by casting it from a solution made with the aid of solvents, which are not otherwise solvents of oil-soluble dyestuffs.

The above examples are ample proof that the process does more than merely comminute and commingle the various ingredients, which, unless there actually occurred a bonding or plasticizing action, would strip and settle out in layers, according to the various specific gravities, as in the case of heavy mineral fillers, for instance, or separate out, as in the case of undissolved oils, for instance, or, at least, cause a precipitation of the base, if the composition were to be dissolved in organic solvents, as would be the case with incompatible substances, such as cellulose acetate and shellac, or cellulose acetate and linseed oil.

It is not claimed that the bonding action, occuring in the milling process, is necessarily of a chemical nature, although some of the reactions between the plastic bases and the plasticizing agents should be considered in that light.

The physical reaction is certainly remarkable and the recognition of the principle of utilizing dispersing action of a colloidal mill to weld together into homogeneous thermoplastic compounds, substances otherwise not related, having no affinity, or even entirely incompatible, as well as the principle of utilizing non-solvent, or precipitant dispersing media to prevent the formation of bulky masses and to keep the composition in a finely divided state, ready for instant use in any art, is what I claim as the basis of my invention.

Having thus described the method I prefer to employ in producing thermoplastic compositions, I will now describe three methods of converting them into articles of commerce.

While the methods described below are considered the most economical and efficient, numerous variations and adaptations will, of course, occur to those versed in the arts.

One method is based on the application of the "slurry", which results from the compounding process above described, in a more or less concentrated form, directly to the article, which is to be impregnated or covered with the thermoplastic compound. Thus, for instance, paper or fibre board could be covered with a layer of plastic composition in "slurry" form, the liquid dispersing medium, water for instance, could be evaporated while the paper base passes through the drying machine in the paper mill, after which hot calenders or stacks could fuse the thermoplastic composition, forming a water- or greaseproof coating, or giving the paper or board any other desired properties or finishes, according to the substances used in the making of the "slurry".

This would make paper conversion, which is now a separate and distinct art, a part of the papermaking routine, with a considerable saving in cost, elimination of fire hazard etc. It is to be understood, however, that when paper conversion is here mentioned, reference is made only to steps involving the use of thermoplastic substances, such as would come within the scope of this invention. Similarly, the production of artificial leather, floor covering, or any other type of coated fabric, could be simplified by the application of the "slurry" directly to the fabric base, giving in one operation a coating of any desired thickness, as the absence of volatile solvents permits of the application of even a very heavy layer of thermoplastic compound, such as would require from three to six coatings by the ordinary method of spreading or spraying.

Such a "slurry" made in a medium which has a certain affinity for textiles, which is compatible with water-soluble sizes and which is not affected by the moisture content of the fabric, being at the same time non-hazardous, could easily be applied at the textile mill, either as a permanent sizing or as finishing coat, thereby eliminating many conversion steps in separate mills. The second method is recommended where the substance to be covered with a thermoplastic composition, being non-porous and therefore unable to absorb or pass out moisture, does not lend itself to the use of a "slurry".

Where, for instance, steel or other metal sheets or objects are to be covered, or where, for instance, asbestos board is to be enameled to imitate glazed tile, or where leather is to be given a lacquered, so called patent-leather finish, or in any other similar case, where the least trace of moisture would be objectionable, the dispersing medium of the "slurry" is first removed by any means well known to the skilled engineer, such as spray-drying, or drying in vacuo, after which the fine powder is applied to the surface of the metal or asbestos board, or to the leather, and welded on by means of heat and pressure. Where solid bodies are to be formed entirely from thermoplastic compositions, either of the two methods above described can be employed, depending on the product, the type of equipment available and other factors.

Thus, for instance, thin films or tissue-like transparent foil could be produced from a slurry on equipment and by methods similar to those employed in the paper industry, while bulky pieces, such as molded insulation, novelties etc., would necessarily be made from the plastic in dry form, in order to save the time required to evaporate the dispersing medium from each individual article before curing, fusing the plastic composition. The third method of converting thermoplastic compositions from the "slurry" stage to a finished article of commerce is particularly adapted to the production of film, thin transparent wrapping tissue, or surface coatings, where time and space are factors and where the evaporation of the dispersing medium from the slurry would involve long runs, or temperatures, which could affect the texture, color, or any other properties of the product. In such cases the thermoplastic base is dispersed in some suitable equipment, such as colloidal mill, for instance, together with all the other ingredients entering into the composition, with the exception of the plasticizing media, which are left out temporarily.

The plasticizers are dissolved in, or diluted with, another medium, which must be a non-solvent of the plastic base and, furthermore, miscible with the dispersing medium of the composition. The diluted plasticizer is added gradually and under vigorous stirring to the "slurry", when gelatinization, or coagulation, takes place, the solids in the slurry combining with the plasticizer in the other liquid medium, forming a gel, from which the mixture of the two liquid media separates out very readily. As an example, 100 lbs. of cellulose acetate are dispersed in about 50 gallons of water. Then 25 lbs. of diethyl phthalate, 20 lbs. of para-toluene sulfonamid, 10 lbs. of plastol and 10 lbs. of triphenyl phosphate are dissolved in 2-3 gallons of ethyl alcohol. When the diluted plasticizer is combined with the cellulose acetate "slurry" in the manner above described, a gel will result, from which the remaining moisture can be readily removed by squeezing between rollers, after which the dough-like plastic composition can be rolled down to the desired thickness and, after the last traces of moisture have been removed, it can be calendered down to a high degree of transparency and gloss.

The term "modifying agent", as used hereinafter in the claims, is to be construed as meaning liquid or solid plasticizers, oils, gums and resins.

Having set forth the object and nature of my invention, what is claimed as new and what I desire to secure by Letters Patent is:

1. Process for compounding thermoplastic compositions, which comprises grinding a thermoplastic organic derivative of cellulose in a liquid medium, which is a non-solvent for the organic derivative of cellulose, to form a dispersion, and adding to the dispersion a homogeneous composition containing a plasticizer, said composition being insoluble in the said liquid medium, in an amount sufficient to cause gelatinization of the organic derivative of cellulose.

2. Process for compounding thermoplastic compositions, which comprises grinding cellulose acetate in a liquid medium, which is a non-solvent for the cellulose acetate, to form a dispersion, and adding to the dispersion a homogeneous composition containing a plasticizer, said composition being insoluble in the said liquid medium, in an amount sufficient to cause gelatinization of the cellulose acetate.

HENRY JACOBSEN.